(No Model.)
F. C. WIEDRING.
PROCESS OF AND APPARATUS FOR AGING BEER, WINE, &c.
No. 564,130. Patented July 14, 1896.
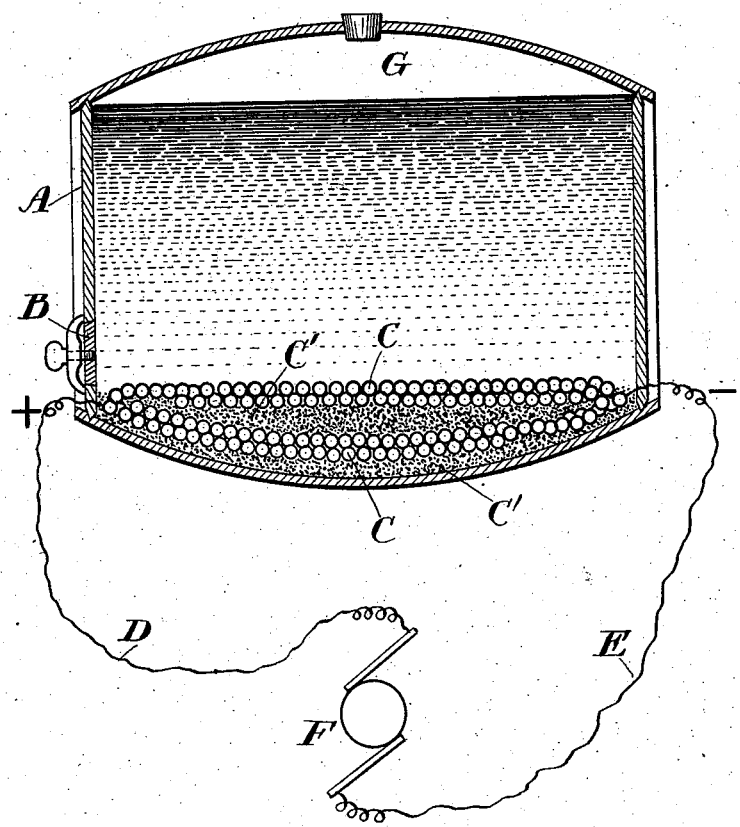
Witnesses:
J. Halpenny
A. H. Cooper
Inventor:
Ferdinand C. Wiedring
By his attorneys
Craley & Hopkins

UNITED STATES PATENT OFFICE.

FERDINAND C. WIEDRING, OF CHICAGO, ILLINOIS.

PROCESS OF AND APPARATUS FOR AGING BEER, WINE, &c.

SPECIFICATION forming part of Letters Patent No. 564,130, dated July 14, 1896.

Application filed June 11, 1894. Serial No. 514,152. (No model.)

*To all whom it may concern:*

Be it known that I, FERDINAND C. WIEDRING, a citizen of Germany, who have declared my intention to become a citizen of the United States, residing at Chicago, in the county of Cook and State of Illinois, have invented certain new and useful Improvements in Processes of and Apparatus for Aging Beer, Wine, and other Liquors, of which the following is a specification, reference being had to the accompanying drawing, which is made a part hereof, and which shows, in sectional elevation, the apparatus used in carrying out the invention.

The invention consists in the features of novelty that are particularly pointed out in the claims, and in order that it may be fully understood I will describe it with reference to the drawing, in which—

A represents the chip-cask, of customary or any desired construction, and C represents a mass of small pieces of metal, preferably in the form of balls, in the bottom of the cask. As shown, this metal is arranged in two layers, the lower of which is embedded in a mass C' of chips or shavings, but so far as the present invention is concerned these chips or shavings may be dispensed with. Their object is to facilitate and hasten the precipitation of solid particles that are held in suspension by the beer, and this object is accomplished as perfectly by using a hard substance such as described, and aside from this, a hard substance has the advantage of being cheaper in the long run, since it may be cleaned easily and used an indefinite number of times.

I am aware that it has been proposed to place in the bottom of a "chip-cask" a number of metallic slats, but so far as I am aware, I am the first to use in a chip-cask, either in connection with a current of electricity or without, a lot of balls. Where a current of electricity is used, the balls are preferred for the reason that the electricity will be distributed uniformly over them; and where the current is not used, the balls are preferred for the reason that they provide a greater surface for catalytic action than chips such as ordinarily used do. Another reason for preferring them in either case is that they can be easily and quickly handled and are without interstices in which decayed matter can accumulate.

At diametrically opposite points the granular mass C is placed in electrical connection with wires D and E, which in turn are connected with the positive and negative poles, respectively, of a source of electricity F, in such manner that C, D, and E constitute a complete electrical circuit. This completes the description of the apparatus for carrying out my improved process of aging liquor, which I will first describe in its application to the manufacture of beer, and then point out the manner of its application to other liquors.

Heretofore it has been the practice in carrying out the process of after-fermentation to such a stage that the beer possesses the aroma and taste which are the desired peculiarities of fully matured and ripened beer, to allow the beer being treated to remain in a quiescent state for from three to six months in what is known as the "settling-cask." In from ten to fifteen days the beer will have attained all of those qualities which it is the object of this process of after-fermentation to impart to it, excepting only the particular aroma and taste before mentioned. For a number of years the fact has been known that this particular aroma and taste are due to the dying of the yeast-cells. Unaided by artificial means it takes about five or six months for these cells to die, but they can be quickly killed by the use of a current of electricity, and when so killed they will give off the same aroma as if they were allowed to die by the natural process.

In carrying out my improved process, I add to the beer to be aged, as a preparatory step in the process of after-fermentation, a quantity of yeast, and for this purpose I prefer to use yeast that is practically pure and free from other substances. This is not essential, however, and if desired, instead of pure yeast I may add from ten to twenty-five per cent of newly-brewed beer, or "krauesenbeer," which, as is well known, contains many yeast-cells. The use of the freshly-brewed beer for this purpose is, however, objectionable, for the reason that the quality of the beer to be treated is impaired practically in proportion to the amount of freshly-brewed beer that is mixed with it. To avoid this objection, I prefer to use yeast, but the yeast should be washed in order to free it from impure foreign substances.

The mixed yeast and beer are allowed to remain in the chip-cask in a quiescent state until the beer possesses all of those properties which it is the object of the process of after-fermentation to impart to it, excepting that particular aroma and flavor that are due to dying of the yeast-cells. As before stated, it requires from three to six months for these cells to die by the natural process, and to materially reduce this time is the principal object of the present invention. It is accomplished by passing a current of electricity through the mass of metal in the bottom of the chip-cask. This mass is in its nature open, so that the yeast may settle in the interstices between its particles and on the surface of them. The particles composing it being good conductors of electricity and in electrical contact with each other, the current will pass through the yeast-cells which cover them and they will be killed. I do not limit myself to the use of any particular means for bringing the current into contact with the yeast-cells, but, on the contrary, I regard my invention as comprehending, broadly, and regardless of the means for accomplishing it, the subjecting of the yeast-cells while in the presence of the liquor and during the process of after-fermentation to the action of a current of electricity.

I am aware that it has been proposed to pass a current of electricity through fully-brewed beer, meaning thereby beer that is ready for the market, and that it has been proposed to pass a current of electricity through partially-brewed beer during the process of (first) fermentation, for the purpose (in both instances) of killing all of yeast-cells and other living organisms that are in it, but such is not the equivalent of my invention. Killing all of the yeast-cells will defeat the object of my invention, which is to produce by a quick method beer which in the matter of flavor, aroma, and other characteristics resembles as nearly as possible beer that is allowed to ripen with age. I do not aim to produce beer that differs from beer that is allowed to ripen with age, but I do aim to produce beer that resembles it, and this aim will fail if all of the yeast-cells are killed. It is for this reason that I prefer not to pass the current through liquor itself, and instead bring only some of the cells into contact with an electrified body.

It is not the equivalent of my invention to apply the current at any other stage than during the process of after-fermentation. If it is applied during the process of first fermentation, all of the yeast resulting from that process is rendered useless and becomes a loss, and the results are not the same. If it is applied after the beer has been drawn off from the precipitated yeast, there will not be enough yeast left in the beer to give the desired result. Hence I prefer to accomplish my object by adding to the beer in the chip-cask as a preparatory step in the process of after-fermentation a sufficient quantity of pure yeast for carrying out the process of after-fermentation, and then, after the beer has been carbonated and cleared and the yeast has been precipitated, applying the current to the precipitated yeast for a sufficient length of time to kill the required number of cells, the aroma of which will pass upward and permeate the beer.

The above description has been confined to an application of the invention to what is known as the "process of after-fermentation" in the manufacture of beer, but without any alteration whatever it is in like manner applicable to the treating of all other liquors to which it is desirable to impart that particular aroma and taste which are due to the dying of the yeast-cells in the presence of the liquor.

Having thus described my invention, the following is what I claim as new therein and desire to secure by Letters Patent:

1. The process of aging liquor containing yeast, which consists in allowing the yeast to be precipitated, passing through the precipitated yeast a current of electricity whereby some of the yeast-cells are killed, allowing the liquor and precipitated yeast to remain quiescent a sufficient length of time to permit the aroma from the dead yeast-cells to pass upward and permeate the liquor, and then separating the liquor and precipitated yeast, substantially as set forth.

2. The process of aging liquor containing yeast which consists in allowing the yeast to be precipitated over an electrical circuit made up of a lot of loose balls, passing a current of electricity through said circuit and through the yeast that has been precipitated upon it whereby yeast-cells are killed, and then separating the liquor and precipitated yeast, substantially as set forth.

3. The process of aging beer which consists in adding to it, after the main or first fermentation, a quantity of yeast, subjecting the yeast while in the presence of the beer, and during the process of after-fermentation, to the action of a current of electricity, whereby yeast-cells are killed, allowing the beer and precipitated yeast to remain quiescent a sufficient length of time to permit the aroma from the dead yeast-cells to pass upward and permeate the beer and then separating the beer and precipitated yeast, substantially as set forth.

4. The process of aging beer, which consists in adding to the beer after the main fermentation, a quantity of yeast, allowing the yeast to be precipitated, subjecting the precipitated yeast while in the presence of the liquor and during the process of after-fermentation to the action of a current of electricity, whereby yeast-cells are killed, allowing the beer and precipitated yeast to remain quiescent a sufficient length of time to permit the aroma from the dead yeast-cells to pass upward and permeate the beer, and then separating the beer and precipitated yeast, substantially as set forth.

5. The process of aging liquor which consists in adding to it a quantity of yeast, allowing the yeast to be precipitated over the surface of a closed electrical circuit, passing a current of electricity through said circuit and through the yeast that has been precipitated over its surface whereby yeast-cells are killed, allowing the liquor and precipitated yeast to remain quiescent a sufficient length of time to permit the aroma from the dead yeast-cells to pass upward and permeate the liquor, and then separating the liquor and precipitated yeast, substantially as set forth.

6. The process of aging liquor which consists in adding to it a quantity of yeast, allowing the yeast to be precipitated upon a loose mass of material which is a conductor of electricity, and passing a current of electricity through said mass of material and through the yeast that has been precipitated upon it, whereby yeast-cells are killed, substantially as set forth.

7. In an apparatus for use in treating liquors, the combination of a receptacle, a mass of small pieces of metal arranged in the bottom of the receptacle and in contact with each other, so as to form a closed electrical circuit and a source of electricity electrically connected with said mass of metal, substantially as set forth.

8. In an apparatus for use in treating liquor, the combination of a receptacle, a number of loose balls of material that is a conductor of electricity arranged in the bottom thereof, said balls being arranged in electrical contact with each other, and a source of electricity electrically connected with said balls, substantially as set forth.

FERDINAND C. WIEDRING.

Witnesses:
L. M. HOPKINS,
J. HALPENNY.